(12) United States Patent
Majima et al.

(10) Patent No.: US 9,223,163 B2
(45) Date of Patent: Dec. 29, 2015

(54) FILM, AND METHOD OF PRODUCING SAME

(71) Applicant: FUJIFILM CORPORATION, Tokyo (JP)

(72) Inventors: Wataru Majima, Ashigarakami-gun (JP); Kazuhiro Oki, Ashigarakami-gun (JP); Hirotoshi Andou, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/286,652

(22) Filed: May 23, 2014

(65) Prior Publication Data

US 2014/0253860 A1      Sep. 11, 2014

Related U.S. Application Data

(63) Continuation of application No. PCT/JP2012/079201, filed on Nov. 12, 2012.

(30) Foreign Application Priority Data

Nov. 25, 2011   (JP) ................................. 2011-257792

(51) Int. Cl.
*C09K 19/00*       (2006.01)
*G02F 1/1333*      (2006.01)
(Continued)

(52) U.S. Cl.
CPC ............ *G02F 1/133365* (2013.01); *G02B 1/04* (2013.01); *G02B 5/208* (2013.01);
(Continued)

(58) Field of Classification Search
CPC .............. G02F 1/133365; G02F 2001/133354; G02F 2001/133357; G02B 5/3016; G02B 5/3041; G02B 5/305; G02B 5/3083; G02B 5/32; C09K 19/56; C09K 2019/548; B32B 2038/168; B32B 2038/0076; B32B 2310/0831; Y10T 428/1005
USPC ........ 428/1.2, 442; 427/160–162, 163.1, 164, 427/487, 490, 520; 349/191, 193, 194
See application file for complete search history.

(56) References Cited

U.S. PATENT DOCUMENTS 7,294,303 B2    11/2007 Fukuoka et al.
2006/0119783 A1  6/2006 Fukuoka et al.
(Continued)

FOREIGN PATENT DOCUMENTS

JP      3500127 B2    5/2007
JP      4008358 B2   11/2007
(Continued)

OTHER PUBLICATIONS

International Preliminary Report on Patentability dated Jun. 5, 2014, issued in PCT/JP2012/079201 (Forms PCT/IB/326, PCT/IB/373, PCT/ISA/237 and PCT/IB/338).
(Continued)

*Primary Examiner* — Ruiyun Zhang
(74) *Attorney, Agent, or Firm* — Birch, Stewart, Kolasch & Birch, LLP

(57) ABSTRACT

Provided is a method of producing a film including: a coating step of coating, on a substrate, a polymerizable liquid crystal composition containing a polymerizable liquid crystal compound, an alignment controlling agent capable of controlling alignment of the polymerizable liquid crystal compound, a polymerization initiator and coated film a solvent; and a drying step of drying, wherein the alignment controlling agent is a compound represented by formula (1) below, and the alignment controlling agent is added in 0.005 to 0.2 parts by mass relative to 100 parts by mass of the polymerizable liquid crystal compound:

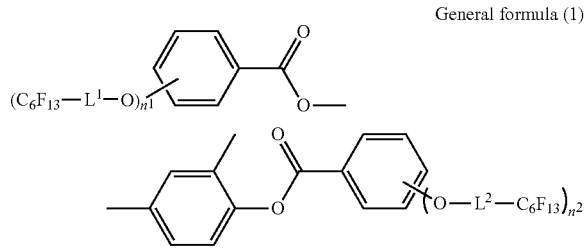

General formula (1)

In general formula (1), each of $L^1$ and $L^2$ represents an alkylene group having 1 to 6 carbon atoms that may be substituted with a fluorine atom or the like, and $n^1$ and $n^2$ represents integers of 3 or more.

20 Claims, 1 Drawing Sheet

(51) Int. Cl.
  *G02B 1/04* (2006.01)
  *G02B 5/30* (2006.01)
  *G02B 5/20* (2006.01)
  *C09K 19/04* (2006.01)
  *C09K 19/20* (2006.01)

(52) U.S. Cl.
  CPC ....... *G02B 5/3016* (2013.01); *C09K 2019/044* (2013.01); *C09K 2019/0448* (2013.01); *C09K 2019/2078* (2013.01); *C09K 2219/03* (2013.01); *Y10T 428/1005* (2015.01)

(56) References Cited

U.S. PATENT DOCUMENTS

| | | |
|---|---|---|
| 2011/0229725 A1 | 9/2011 | Oki et al. |
| 2014/0138580 A1 | 5/2014 | Mizumura et al. |

FOREIGN PATENT DOCUMENTS

| | | |
|---|---|---|
| JP | 4109914 B2 | 7/2008 |
| JP | 2008-197170 A | 8/2008 |
| JP | 2009-514022 A | 4/2009 |
| JP | 2011-191582 A | 9/2011 |
| JP | 2013-47204 A | 3/2013 |
| WO | WO 2007/050433 A1 | 5/2007 |

OTHER PUBLICATIONS

International Search Report issued in PCT/JP2012/079201 on Feb. 12, 2013.

Japanese Office Action issued in corresponding Japanese Patent Application No. 2011-257792, dated Jun. 16, 2015.

FILM, AND METHOD OF PRODUCING SAME

CROSS-REFERENCE TO RELATED APPLICATIONS

The present application is a continuation of PCT/JP2012/079201 filed on Nov. 12, 2012, which claims priority to Japanese Patent Application No. 2011-257792 filed on Nov. 25, 2011, the entire contents of which are incorporated by reference into the present application.

TECHNICAL FIELD

The present invention relates to a film having a polymer layer that uses a polymerizable liquid crystal compound, and to a method of producing the same. Preferably, it relates to a method of producing an infrared light-reflective film that utilizes a light reflection layer constituted by fixing a cholesteric liquid crystal phase. The film of the present invention is useful for a heat-shielding member for windows of automobiles.

BACKGROUND ART

In recent years, from growing interest in environment/energy, there has been a great need for industrial products related to energy saving and, as one of these, glass and a film that are effective for heat shielding of window glass of houses, automobiles and the like, that is, for reducing a thermal load by sunlight are required. In order to reduce a thermal load by sunlight, it is necessary to prevent the transmission of sunbeam either in a visible light region or in an infrared region of the solar spectrum. In particular, as to windows for automobiles, high transmittance for the visible light region is required from the viewpoint of safety, and a demand for heat shielding is also high, and there is also a movement to regulate insolation reflectivity in some countries.

What is used frequently as eco-glass having high heat insulating/heat shielding properties is a multilayered glass coated with a special metal film that shields heat radiation, which is referred to as Low-E pair glass. The special metal film can be made by laminating a plurality of layers by, for example, a vacuum deposition method. These coatings of a special metal film made by a vacuum deposition are extremely excellent in reflection performance, but a vacuum process has a low productivity and requires high production cost. Furthermore, through the use of a metal film, electromagnetic waves are shielded at the same time, and thus there are such problems as causing electromagnetic obstruction in the case of using a mobile phone or the like and making ETC useless when the film is used for automobiles. Moreover, in addition to the electromagnetic obstruction, windows of automobiles are also required to have high transmittance for the visible light region from the viewpoint of safety.

On the other hand, there is proposed a method that utilizes a cholesteric liquid crystal phase. For example, as disclosed in Patent Literature 1, light of circularly-polarized light in one direction can be reflected selectively with high efficiency in the region of 700 to 1200 nm by forming one cholesteric liquid crystal phase on each surfaces of a λ/2 plate.

In addition, in Patent Literature 2, an infrared light-reflecting article having a cholesteric liquid crystal layer is disclosed. As to an infrared light-reflecting article using a cholesteric liquid crystal layer, there are many attempts for the utilization for liquid crystal display devices. Specifically, there are many attempts to cause light in the visible light region to be reflected effectively. For example, in Patent Literature 3, there is disclosed a liquid crystal display device in which a plurality of cholesteric layers are laminated.

In producing a film including a cholesteric liquid crystal layer, there is used, for example, a method in which a coated film containing a cholesteric liquid crystal material is dried, heated and aligned, and cured by ultraviolet rays. As to a method for curing a cholesteric liquid crystal layer, for example, as exemplified in Patent Literature 4, a method of curing a polymerizable liquid crystal compound by performing irradiation with ultraviolet rays is generally used, and there is disclosed a method for producing a cholesteric liquid crystal film with reflection wavelength of a broad region by adjusting illumination intensity within a certain range.

Here, in particular, for the intended use of the above-mentioned infrared light-reflecting article for automobiles, a high-quality film having good surface conditions and without unevenness is required. However, there is such a problem in which, when a film is produced by coating and drying a polymerizable liquid crystal composition containing a polymerizable liquid crystal compound, in particular, wind unevenness in drying (specifically, thickness unevenness in a film) is generated in a film to be produced (for example, see Patent Literature 5). In addition, similarly In Patent Literature 5, again, there are described a problem of the generation of unevenness also in a liquid crystal alignment when a polymerizable liquid crystal compound is aligned, and a problem of the generation of another problem of surface conditions (streaks in Patent Literature 5) in addition to wind unevenness in drying.

For problems of these various unevenness and surface conditions, in the invention described in Patent Literature 5, there is described a method for suppressing wind unevenness in drying by adding a fluorine-containing polymer as a compound having a function of preventing wind unevenness in drying to a coating liquid containing a liquid crystalline compound to thereby lower the surface tension thereof, and by causing the same to pass through a casing that is disposed with a condensation plate in initial drying immediately after the coating to thereby dry the same so that a boundary layer near the coated film is not disturbed.

On the other hand, in Patent Literature 6, as a method for producing a laminated film having two layers or more of a fixed cholesteric liquid crystal phase, there is described a method of repeating a step of coating a curable liquid crystal composition containing a rod-like liquid crystal compound, a fluorine-based alignment controlling agent of a specific structure and a solvent, and a step of drying the coated film to form a cholesteric liquid crystal phase, and after that, curing the same and fixing a cholesteric liquid crystal layer. In Patent Literature 6, attention is focused on coating repelling defect caused by an alignment controlling agent contained in the under layer of a fixed cholesteric liquid crystal phase when a second layer is formed, but attention is not focused on wind unevenness in drying of a coated film formed by coating a curable liquid crystal composition.

CITATION LIST

Patent Literature

[Patent Literature 1] Japanese Patent No. 4109914
[Patent Literature 2] Japanese Unexamined Patent Application Publication (Translation of PCT Application) No. 2009-514022
[Patent Literature 3] Japanese Patent No. 3500127
[Patent Literature 4] Japanese Patent No. 4008358

[Patent Literature 5] Japanese Patent Application Laid-Open Publication No. 2008-197170
[Patent Literature 6] Japanese Patent Application Laid-Open Publication No. 2011-191582

SUMMARY OF INVENTION

Problems to be Solved by the Invention

An object of the present invention is to solve the above-mentioned problems. That is, the problem to be solved by the present invention is to provide a method of producing a film which enables suppressed wind unevenness in drying and a good liquid crystal alignment, and in which other surface conditions are good.

The present inventors have conducted intensive study to solve the above-mentioned problem and as the result, have found newly an alignment controlling agent that is excellent in the suppression effect of wind unevenness in drying as compared with alignment controlling agents described in Patent Literatures 5 and 6. The newly found alignment controlling agent can give the suppression effect of wind unevenness even when the addition amount is small. In the present invention, the inventors have found that there can be produced a film excellent in all of the wind unevenness in drying, liquid crystal alignment and other surface conditions by using a polymerizable liquid crystal composition to which an alignment controlling agent of a specific structure was added to an amount in a specific range.

The present inventions for solving the problem are as follows.

[1] A method of producing a film including:
 a coating step of coating, on a substrate, a polymerizable liquid crystal composition containing (A) a polymerizable liquid crystal compound, (B) an alignment controlling agent capable of controlling alignment of the polymerizable liquid crystal compound, (C) a polymerization initiator and (D) a solvent; and
 a drying step of drying the coated film formed,
wherein the alignment controlling agent is a compound represented by a general formula (1) below, and the alignment controlling agent is added in 0.005 to 0.2 parts by mass relative to 100 parts by mass of the polymerizable liquid crystal compound;

[3] In the method of producing a film according to [1] or [2], the polymerizable liquid crystal compound is preferably a rod-like polymerizable liquid crystal compound.
[4] In the methods for producing a film according to [1] to [3], the alignment controlling agent is preferably a horizontal alignment agent capable of causing the polymerizable liquid crystal compound to be aligned horizontally.
[5] In the method of producing a film according to any one of [1] to [4], the substrate is preferably a polyethylene terephthalate film.
[6] In the method of producing a film according to any one of [1] to [5], preferably a surface tension of the polymerizable liquid crystal composition 100 msec after forming a gas-liquid interface is controlled to be more than 24.5 mN/m and 28.0 mN/m or less.
[7] The method of producing a film according to any one of [1] to [6] preferably includes a laminating step of laminating two or more polymer layers obtained by drying a coated film by repetition of the coating step and the drying step at least once while changing at least one of a type and addition amount of a component contained in the polymerizable liquid crystal composition, on a polymer layer obtained by drying the coated film.
[8] In the method of producing a film according to any one of [1] to [7], preferably the polymerizable liquid crystal compound is a cholesteric liquid crystal compound, the method including an alignment step of aligning the polymerizable cholesteric liquid crystal compound by applying heat after the coating step to thereby form a state of a cholesteric liquid crystal phase, and an irradiation step of irradiating the polymerizable liquid crystal composition with actinic radiation to thereby fix the cholesteric liquid crystal phase.
[9] In the method of producing a film according to any one of [1] to [8], preferably a chiral agent is added to the polymerizable liquid crystal composition.
[10] In the method of producing a film according to any of [1] to [9], the polymer layer obtained by drying the coated film is an infrared light reflection layer that reflects infrared light having a wavelength of 800 nm or more.
[11] The method of producing a film according to any one of [1] to [10] preferably has, at least one step of drying a coated film to thereby form a layer that reflects light of right circu- General formula (1)

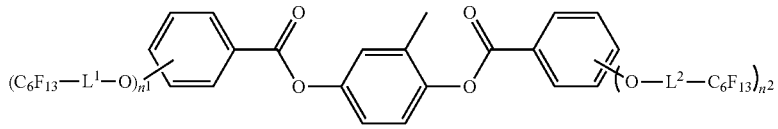

(in general formula (1), each of $L^1$ and $L^2$ represents independently an alkylene group having 1 to 6 carbon atoms that may be substituted with a fluorine atom. One $CH_2$ or two or more ($CH_2$)s not adjacent to each other in the alkylene group may be replaced with —O—, —S—, —COO—, —COO—, —$NR^a$—, —$NR^aCO$—, —$CONR^a$—, —$NR^aSO_2$— or —$SO_2NR^a$— ($R^a$ represents hydrogen atom or an alkyl group having 1 to 5 carbon atoms). Each of $n^1$ and $n^2$ represents independently an integer of 3 or more, wherein structures in parentheses that exist in a plural number may be the same or different from each other.).

[2] The drying step according to [1] is preferably a drying step of applying air.

larly polarized light, and at least one step of drying a coated film to thereby form a layer that reflects light of left circularly polarized light.

[12] The method of producing a film according to any one of [1] to [11] is preferably a method of producing a film for a window material for automobiles or a window material for buildings.

[13] A film produced by the method of producing a film according to any one of [1] to [12].

Effect of the Invention

According to the present invention, there can be produced a film which has suppressed wind unevenness in drying, has good liquid crystal alignment and also in which other surface conditions are good.

MODES OF CARRYING OUT INVENTION

Figure 1:
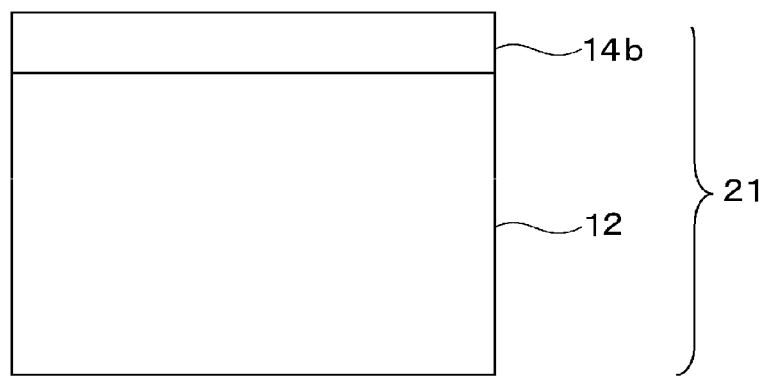
FIG. 1 is a schematic view showing a cross-section of one example of a film produced by the method of producing a film of the present invention.

Hereinafter, contents of the present invention will be explained in detail. The explanation of constituent components described below may be carried out on the basis of a representative embodiment of the present invention, but the present invention is not limited to the embodiment. In the description of the present application, "to" is used in such a meaning as including values described before and after thereof as the lower limit and the upper limit. In the present description, a polymerizable group denotes a group that starts a polymerization reaction by actinic radiation irradiation.

[Method of Producing Film]

The method of producing a film of the present invention (hereinafter, also referred to as the production method of the present invention) includes: a coating step of coating, on a substrate, a polymerizable liquid crystal composition containing (A) a polymerizable liquid crystal compound, (B) an alignment controlling agent capable of controlling the alignment of the polymerizable liquid crystal compound, (C) a polymerization initiator and (D) a solvent; and a drying step of drying the coated film formed,
wherein the alignment controlling agent is a compound represented by a general formula (1) below, and the alignment controlling agent is added in 0.005 to 0.2 parts by mass relative to 100 parts by mass of the polymerizable liquid crystal compound, According to such a configuration, through the use of the method of producing a film of the present invention, there can be produced a film which has suppressed wind unevenness in drying, has good liquid crystal alignment and also in which other surface conditions are good.

Here, in the present description, "wind unevenness in drying" is one form of thickness unevenness of a film and refers to unevenness in which the peak-valley value of film thickness in a size of about 10 cm×10 cm is about 100 nm on average. In the present description, "liquid crystal alignment" means alignment of a defect-free state when a film is observed with a polarization microscope. In addition, in the present description, "other surface conditions" mean surface defects other than the drying unevenness and alignment defect, including random stripes, repelling, or the like.

<Steps for Production>

Hereinafter, materials and steps preferably used in the method of producing a film of the present invention will be explained sequentially. First, respective production steps that are used preferably in the present invention will be explained.

(Coating Step)

The production method of the present invention includes a coating step of coating, on a substrate, a polymerizable liquid crystal composition containing (A) a polymerizable liquid crystal compound, (B) an alignment controlling agent capable of controlling the alignment of the polymerizable liquid crystal compound, (C) a polymerization initiator, and (D) a solvent.

First, components used preferably for the polymerizable liquid crystal composition will be explained.

(A) Polymerizable Liquid Crystal Compound:

The polymerizable liquid crystal composition used for the production method of the present invention contains a polymerizable liquid crystal compound.

The polymerizable liquid crystal compound is preferably a polymerizable cholesteric liquid crystal compound, from the viewpoint of being capable of causing the polymerizable cholesteric liquid crystal compound to be aligned by heating after the coating step to thereby lead to a state of a cholesteric liquid crystal phase, and capable of fixing the cholesteric liquid crystal phase by irradiating the polymerizable liquid crystal composition with actinic radiation to thereby give a function of reflecting infrared light to a film to be obtained.

In the production method of the present invention, the polymerizable liquid crystal compound may be a rod-like General formula (1)

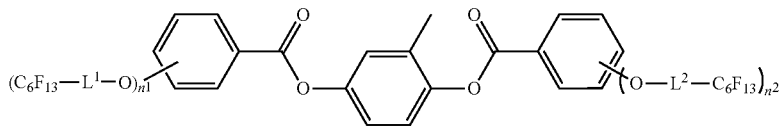

(in general formula (1), each of $L^1$ and $L^2$ represents independently an alkylene group having 1 to 6 carbon atoms that may be substituted with a fluorine atom. One $CH_2$ or two or more ($CH_2$)s not adjacent to each other in the alkylene group may be replaced with —O—, —S—, —COO—, —COO—, —$NR^a$CO—, —$CONR^a$—, —$NR^a SO_2$— or —$SO_2 NR^a$— ($R^a$ represents hydrogen atom or an alkyl group having 1 to 5 carbon atoms). Each of $n^1$ and $n^2$ represents independently an integer of 3 or more, wherein structures in parentheses that exist in a plural number may be the same or different from each other.).

polymerizable liquid crystal compound or a disc-like polymerizable liquid crystal compound (discotic liquid crystalline molecule), but a rod-like polymerizable liquid crystal compound is preferable.

Discotic liquid crystalline molecules are described in various literatures (C. Destrade et al., Mol. Crysr. Liq. Cryst., vol. 71, page 111 (1981); Quaternary Chemistry Review, No. 22, Chemistry of Liquid Crystal, Chap. 5, Chap. 10 Section 2, edited by The Chemical Society of Japan (1994); B. Kohne et al., Angew. Chem. Soc. Chem. Comm., page 1794 (1985); J. Zhang et al., J. Am. Chem. Soc., vol. 116, page 2655 (1994)). The polymerization of a discotic liquid crystalline molecule is described in Japanese Patent Application Laid-Open Publication No. 8-27284. In order to fix a discotic liquid crystalline molecule by polymerization, a polymerizable group must be bonded as a substituent to a disc-like core of the discotic liquid crystalline molecule. When a polymerizable group is bonded directly to the disc-like core, however, it becomes difficult to keep the alignment state in a polymerization reaction. Therefore, between the disc-like core and the polymerizable group, a linking group is introduced. Accordingly, a discotic liquid crystalline molecule having a polymerizable group is preferably a compound represented by a formula below.

D(-L-Q)$_d$

In the above formula, D is a disc-like core; L is a divalent linking group; Q is a polymerizable group; d is an integer of from 4 to 12. Specific examples of the disc-like core (D) in the formula are shown below.

In the specific examples below, LQ (or QL) means a combination of the divalent linking group (L) and the polymerizable group (Q). Among the specific examples below, triphenylene (D4) is particularly preferable.

(D1)
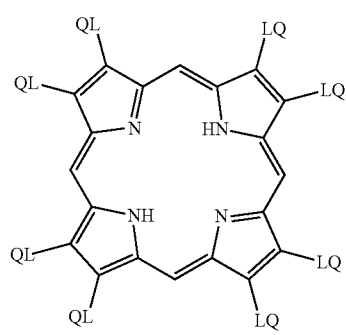

(D2)
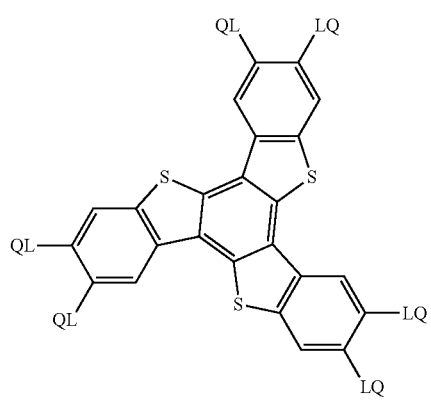

(D3)
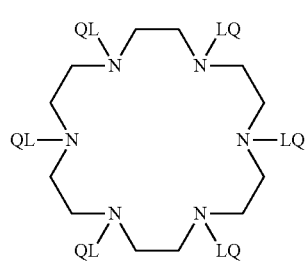

(D4)
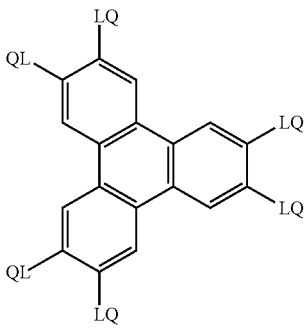

(D5)
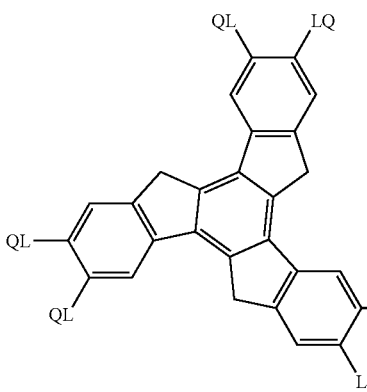

(D6)
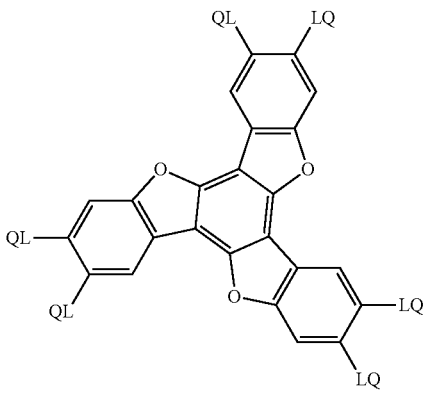

(D7)
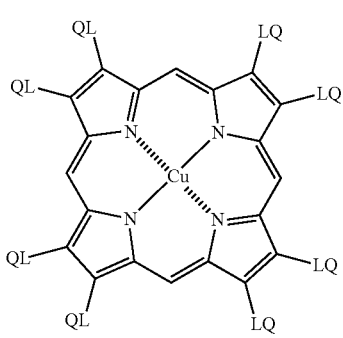

(D8)
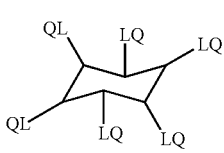

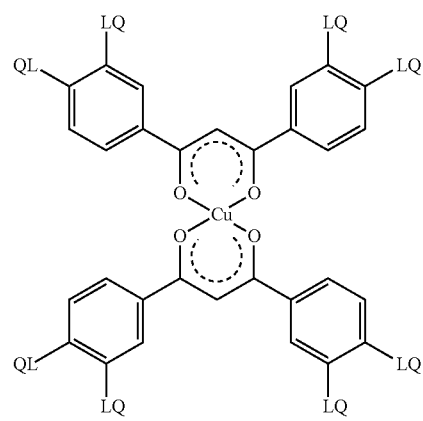
(D9)
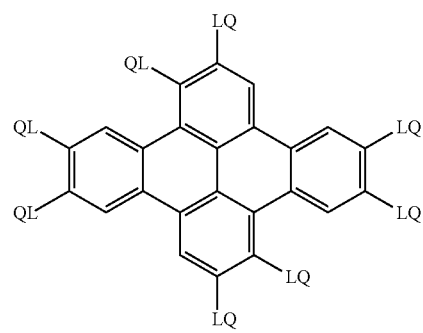
(D10)
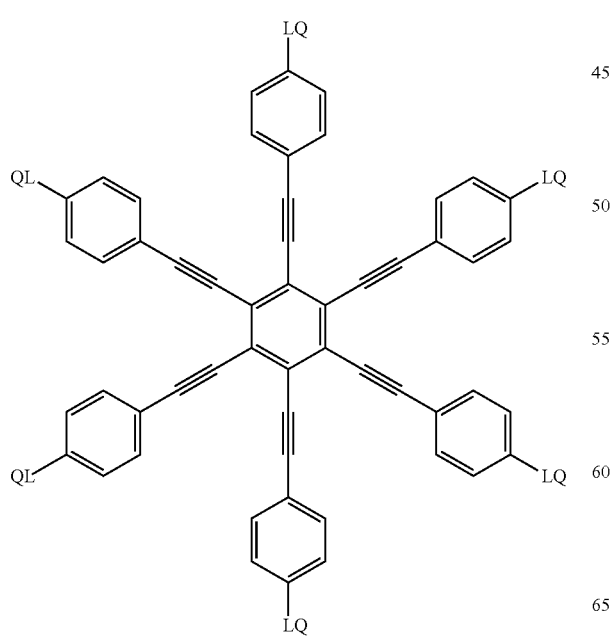
(D11)
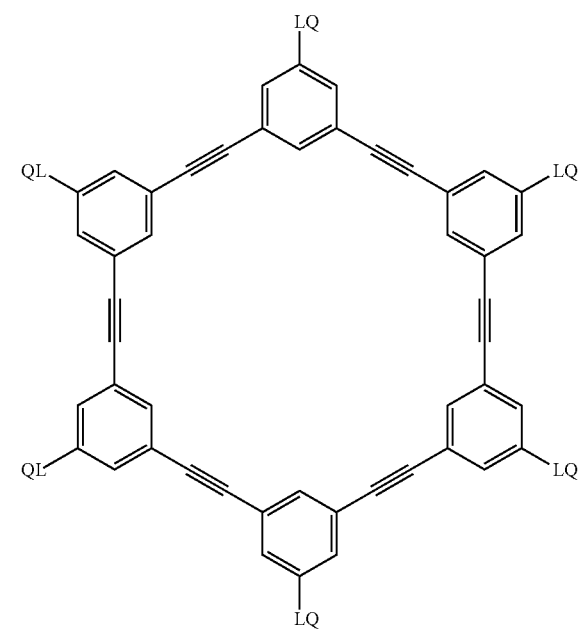
(D12)
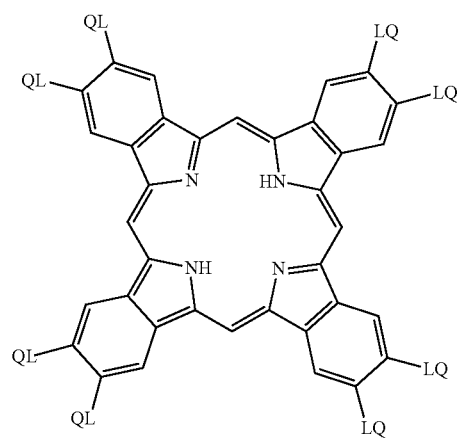
(D13)
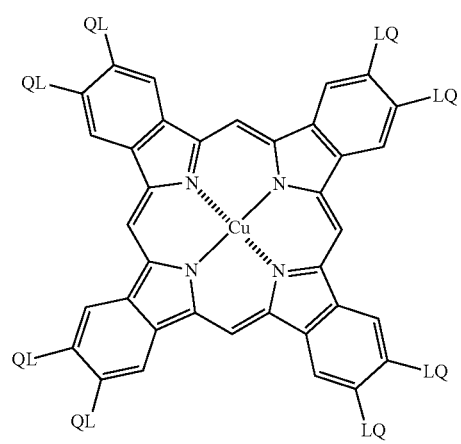
(D14)

-continued

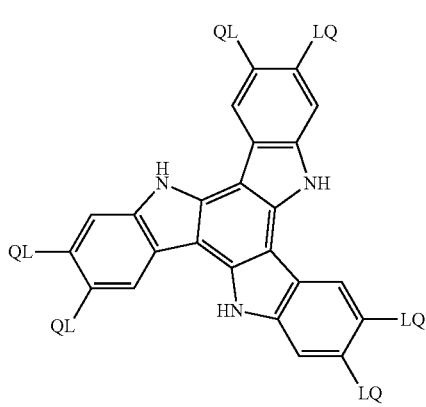

(D15)

As to details and preferable ranges of the linking group L and the polymerizable group Q, paragraphs from [0161] to [0171] of Japanese Patent Application Laid-Open Publication No. 2002-129162 can be referred to.

Examples of the rod-like polymerizable cholesteric liquid crystal compounds usable in the present invention are rod-like nematic liquid crystal compounds. Examples of the rod-like nematic liquid crystal compounds preferably used include azomethines, azoxys, cyanobiphenyls, cyanophenyl esters, benzoic esters, phenyl cyclohexanecarboxylates, cyanophenylcyclohexanes, cyano-substituted phenylpyrimidines, alkoxy-substituted phenylpyrimidines, phenyldioxanes, tolans and alkenylcyclohexylbenzonitriles. Not only low-molecular-weight liquid crystal compounds, but also high-molecular weight-liquid crystal compounds can be used.

Molecules of the rod-like liquid crystal preferably have a birefringence of 0.001 to 0.7. As to the specific examples of polymerizable groups, Japanese Patent Application Laid-Open Publication No. 2002-129162, paragraph [0169] can be referred to. The rod-like liquid crystalline molecule preferably has a molecular structure that is approximately symmetric relative to the short axis direction. To achieve such a structure, the rod-like molecular structure preferably has polymerizable groups at both terminals thereof.

The polymerizable cholesteric liquid crystal compound can be obtained by introducing a polymerizable group into a cholesteric liquid crystal compound. Examples of the polymerizable groups include an unsaturated polymerizable group, an epoxy group and an aziridinyl group, among which an unsaturated polymerizable group is preferable, and an ethylenically unsaturated polymerizable group is particularly preferable. The polymerizable group can be introduced into a molecule of the cholesteric liquid crystal compound by various methods. The number of the polymerizable group of the polymerizable cholesteric liquid crystal compound is preferably from 1 to 6, more preferably from 1 to 3. Examples of the polymerizable cholesteric liquid crystal compounds include compounds described in Makromol. Chem., vol. 190, page 2255 (1989); Advanced Materials, vol. 5, page 107 (1993); U.S. Pat. Nos. 4,683,327, 5,622,648 and 5,770,107; International Patent Publication Nos. WO 95/22586, 95/24455, 97/00600, 98/23580 and 98/52905; Japanese Patent Application Laid-Open Publication Nos. 1-272551, 6-16616, 7-110469, 11-80081, 2001-328973; and the like. Two or more types of polymerizable cholesteric liquid crystal compounds may be used together. The combined use of two or more types of polymerizable cholesteric liquid crystal compounds can lower the alignment temperature.

(B) Alignment Controlling Agent Capable of Controlling the Alignment of Polymerizable Liquid Crystal Compound:

The polymerizable liquid crystal composition used for the production method of the present invention contains an alignment controlling agent capable of controlling the alignment of the polymerizable liquid crystal compound, the alignment controlling agent being a compound represented by general formula (1) below, and contains the alignment controlling agent in 0.005 to 0.2 parts by mass relative to 100 parts by mass of the polymerizable liquid crystal compound.

The compound represented by general formula (1) below is a fluorine-based alignment controlling agent having a perfluoroalkyl group at an end. The fluorine-based alignment controlling agent can reduce a tilt angle of a molecule of a liquid crystal compound or can cause the compound to be aligned substantially horizontally at the air interface of the layer. In the method of producing a film of the present invention, the alignment controlling agent is preferably a horizontal alignment agent that can cause the polymerizable liquid crystal compound to be aligned substantially horizontally. In the present description, the "horizontal alignment" means that the long axis of a liquid crystal molecule and the film surface are parallel to each other, but does not require strict parallelism. In the present description, it means alignment in which the tilt angle relative to the horizontal plane is less than 20 degrees. When the liquid crystal compound is aligned horizontally near the air interface, an alignment defect is hardly generated, and thus transparency in visible light region becomes high. On the other hand, when the molecule of a liquid crystal compound is aligned with a large tilt angle and in the case where, for example, a cholesteric liquid crystal phase is to be set, the spiral axis thereof departs from the normal line of the film plane, and thus the reflectivity lowers or a fingerprint pattern is generated to thereby exhibit the increase in haze or diffraction properties, which is not preferable.

Furthermore, there is a possibility that a compound lowering the surface tension of a coating liquid exists locally at a film surface to thereby obstruct the alignment of a cholesteric liquid crystal on the film surface, or to generate an alignment defect or unevenness of film thickness caused by other coating unevenness in laminating. The compound represented by general formula (1) below to be used in the production method of the present invention can also control these problems.

In the production method of the present invention, the alignment controlling agent is a compound represented by general formula (1) below.

General formula (1)

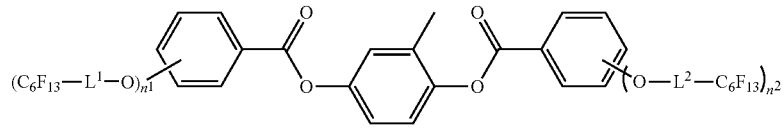

In general formula (1), each of $L^1$ and $L^2$ represents independently an alkylene group having 1 to 6 carbon atoms that may be substituted with a fluorine atom. One $CH_2$ or two or more ($CH_2$)s not adjacent to each other in the alkylene group may be replaced with —O—, —S—, —COO—, —$NR^a$—, —$NR^a$CO—, —$CONR^a$—, —$NR^a SO_2$— or —$SO_2 NR^a$— ($R^a$ represents hydrogen atom or an alkyl group having 1 to 5 carbon atoms).

The number of carbon atoms contained in $L^1$ and $L^2$ is, independently from each other, preferably from 2 to 6, more preferably from 3 to 6, particularly preferably from 4 to 6.

One $CH_2$ or two or more ($CH_2$)s not adjacent to each other in the alkylene group represented by $L^1$ or $L^2$ are substituted preferably by —O—, —S—, —CO—, —COO—, —OCO—, —COS— or —SCO—, more preferably by —O—, —CO—, —COO— or —OCO—.

An alkyl group that may be the $R^a$ may be linear or be branched. The number of carbon in the alkyl group that may be the $R^a$ is more preferably from 1 to 3, being able to exemplify a methyl group, an ethyl group and an n-propyl group.

The alkylene group represented by $L^1$ or $L^2$ may, or may not have a branch, but preferable one is a linear alkylene group having no branch.

Each of $n^1$ and $n^2$ represents independently an integer of 3 or more, in which structures in parentheses that exist in a plural number may be the same or different from each other. Each of $n^1$ and $n^2$ are, independently from each other, preferably from 3 to 5, more preferably 3 or 4, particularly preferably 3.

In the compound represented by general formula (1), the molecular structure may or may not have a symmetric property. The "symmetric property" referred to here means those corresponding to a point symmetry, a line symmetry or a rotational symmetry, and an asymmetric symmetry means those that do not correspond to any of a point symmetry, a line symmetry and a rotational symmetry.

In compounds represented by general formula (1), linking groups $C_6F_{13}$-$L^1$-O— existing in $n^1$ in a molecule are preferably the same to each other, and linking groups $C_6F_{13}$-$L^2$-O— existing in $n^2$ in a molecule are preferably the same to each other. More preferably, all of linking groups $C_6F_{13}$-$L^1$-O— existing in $n^1$ in a molecule and linking groups $C_6F_{13}$-$L^2$-O— existing in $n^2$ in the molecule are the same to each other.

In compounds represented by general formula (1), $C_6F_{13}$-$L^1$-O— and $C_6F_{13}$-$L^2$-O— at the terminals are preferably a group represented by any of general formulae below.

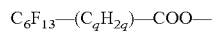

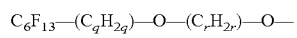

In compounds represented by general formula (1), $C_6F_{13}$-$L^1$-O— and $C_6F_{13}$-$L^2$-O— at the terminals are more preferably a group represented by either of general formulae below.

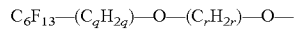

In the above formulae, q is preferably from 0 to 5, more preferably from 1 to 4, particularly preferably from 2 to 3, and particularly preferably 2. r is preferably from 1 to 6, more preferably from 1 to 4, particularly preferably from 2 to 3, and particularly preferably 2.

Specific examples of compounds represented by general formula (1) are shown below. However, compounds represented by general formula (1) that can be employed in the present invention should not be construed in a limited way by specific examples below.

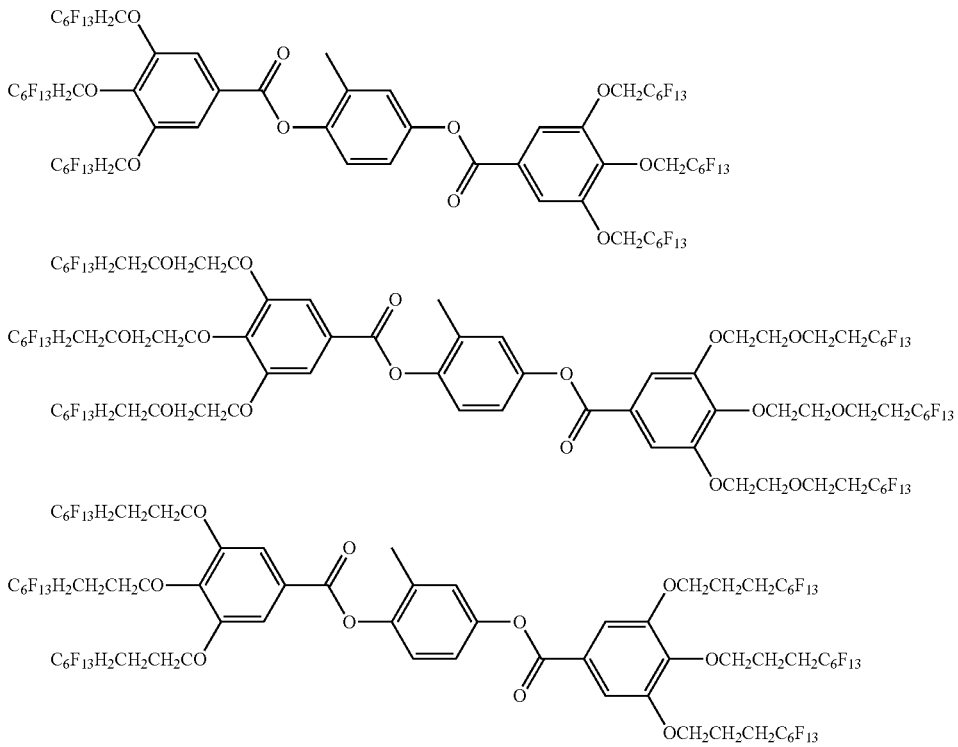

-continued

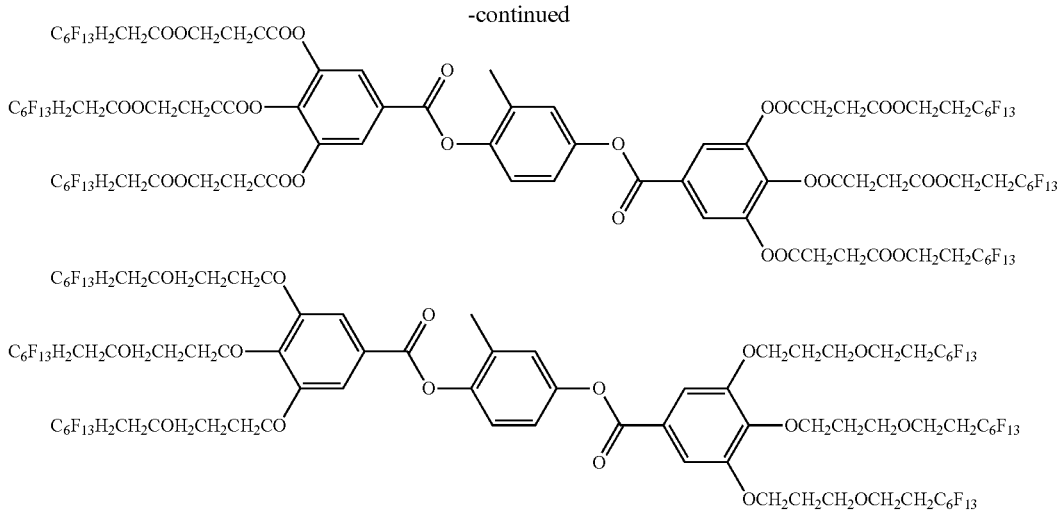

Compounds represented by general formula (1) can be synthesized by selecting and combining suitably synthesis methods described in Japanese Patent Application Laid-Open Publication Nos. 2002-129162 and 2002-97170, and literatures cited in these gazettes. Furthermore, the compounds can be synthesized by combining another known synthesis method as necessary.

In the production method of the present invention, the alignment controlling agent is contained in 0.005 to 0.2 parts by mass, preferably in 0.01 to 0.1 parts by mass, more preferably in 0.02 to 0.09 parts by mass, particularly preferably in 0.03 to 0.08 parts by mass relative to 100 parts by mass of the polymerizable liquid crystal compound.

It is preferable that the content of the alignment controlling agent is equal to the upper limit of the range or less from the viewpoint of the liquid crystal alignment and other surface conditions of a film to be obtained. It is preferable that the content of the alignment controlling agent is equal to the lower limit of the range or more from the viewpoint of improving sufficiently the wind unevenness at the time of drying of a film to be obtained.

(C) Polymerization Initiator:

In the production method of the present invention, the polymerizable liquid crystal composition contains (C) a polymerization initiator. For example, in an embodiment in which a cured film is formed by causing a curing reaction to proceed by ultraviolet ray irradiation, the polymerization initiator to be used is preferably a photopolymerization initiator that can initiate a polymerization reaction by ultraviolet ray irradiation. Examples of the photopolymerization initiators include an α-carbonyl compound (described in each of U.S. Pat. Nos. 2,367,661 and 2,367,670), acyloin ether (described in U.S. Pat. No. 2,448,828), an α-hydrocarbon-substituted aromatic acyloin compound (described in U.S. Pat. No. 2,722,512), a poly nuclear quinone compound (described in each of U.S. Pat. Nos. 3,046,127 and 2,951,758), a combination of triarylimidazole dimer and p-aminophenyl ketone (described in U.S. Pat. No. 3,549,367), an acridine and phenazine compounds (described in Japanese Patent Application Laid-Open Publication No. 60-105667, and U.S. Pat. No. 4,239,850), an oxadiazole compound (described in U.S. Pat. No. 4,212,970), an acylphosphine oxide compound (described in Japanese Patent Nos. 63-40799 and 5-29234, Japanese Patent Application Laid-Open Publication Nos. 10-95788 and 10-29997), etc.

The use amount of the photopolymerization initiator is preferably from 0.1 to 20% by mass, more preferably from 1 to 8% by mass of the polymerizable liquid crystal composition (in the case of a coating solution, the solid content).

(D) Solvent:

In the production method of the present invention, an organic solvent is preferably used as a solvent for the polymerizable liquid crystal composition. No particular limitation is imposed on the organic solvent, and a known solvent can be used. Examples of the solvents include ketones (such as acetone, 2-butanone, methyl isobutyl ketone and cyclohexanone), ethers (such as dioxane and tetrahydrofuran), aliphatic hydrocarbons (such as hexane), alicyclic hydrocarbons (such as cyclohexane), aromatic hydrocarbons (such as toluene, xylene and trimethylbenzene), halogenated hydrocarbons (such as dichloromethane, dichloroethane, dichlorobenzene and chlorotoluene), esters (such as methyl acetate, ethyl acetate and butyl acetate), water, alcohols (such as ethanol, isopropanol, butanol and cyclohexanol), cellosolves (such as methyl cellosolve and ethyl cellosolve), cellosolve acetates, sulfoxides (such as dimethyl sulfoxide), amides (such as dimethyl formamide, dimethyl acetamide), etc.

In the production method of the present invention, one type of, or two or more types of organic solvents can be used, and the use of two or more types of organic solvents is preferable.

From the viewpoint of coated film-forming properties and a production efficiency, the addition amount of the organic solvent in the polymerizable liquid crystal composition is preferably from 50% by mass to 80% by mass, more preferably from 40% by mass to 70% by mass.

Other Components:

The polymerizable liquid crystal composition can contain, in addition to the above-mentioned components, an optically active compound containing an asymmetric carbon atom (chiral agent) and another additive (for example, cellulose ester), as necessary.

In addition, the liquid crystal composition may contain, in order to improve the evenness of alignment, coating suitability, and film strength, at least one type selected from various additives such as unevenness inhibitor, repelling inhibitor and polymerizable monomer. Furthermore, in the liquid crystal composition, as necessary, a polymerization inhibitor, an oxidation inhibitor, an ultraviolet absorber, a light stabilizer, a coloring material, a metal oxide fine particle and the like can be added in a range not deteriorating the optical performances.

Among the above, the polymerizable liquid crystal composition preferably exhibits a cholesteric liquid crystal phase, and for that purpose, preferably contains a chiral agent (an optically active compound). However, when the above-mentioned polymerizable liquid crystal compound is a compound having an asymmetric carbon atom, there are cases where a cholesteric liquid crystal phase can be formed stably even when an optically active compound is not added. The optically active compound can be selected from various types of known chiral agents (for example, described in Liquid Crystal Device Handbook, Chapter 3, Section 4-3, Chiral agents for TN, STN, page 199, edited by Japan Society for the Promotion of Science, the first 42 Committee, 1989). The optically active compound contains, generally, an asymmetric carbon atom, but an axially asymmetric compound or a planar asymmetric compound that contains no asymmetric carbon atom can also be used as a chiral agent. Examples of the axial asymmetric compounds or planar asymmetric compounds include binaphthyl, helicene, paracyclophane and derivatives thereof. The optically active compound (chiral agent) may have a polymerizable group. When an optically active compound has a polymerizable group and a polymerizable liquid crystal compound used together also has a polymerizable group, there can be formed a polymer having a repeating unit derived from the polymerizable liquid crystal compound and a repeating unit derived from the optically active compound, by a polymerization reaction between the polymerizable optically active compound and the polymerizable liquid crystal compound. In this embodiment, the polymerizable group of the polymerizable optically active compound is preferably the same type as that of the polymerizable group of the polymerizable liquid crystal compound. Therefore, the polymerizable group of the optically active compound is also preferably an unsaturated polymerizable group, an epoxy group or an aziridinyl group, more preferably an unsaturated polymerizable group, particularly preferably an ethylenically unsaturated polymerizable group.

Furthermore, the optically active compound may be a liquid crystal compound.

The optically active compound in the polymerizable liquid crystal composition is preferably contained in 1 to 30% by mol relative to the liquid crystal compound used together. As to the use amount of the optically active compound, a smaller amount is preferred because it is often the case that an influence on liquid crystallinity is not exerted. Therefore, as the optically active compound used as a chiral agent, a compound with strong twisting force is preferable so that it is capable of achieving twisted alignment of an intended spiral pitch even in a small amount. A chiral agent exhibiting such strong twisting force includes, for example, a chiral agent described in Japanese Patent Application Laid-Open Publication No. 2003-287623, which can be used in the present invention.

Substrate:

The production method of the present invention can stably form a film by coating the polymerizable liquid crystal composition on a substrate.

No limitation is imposed on the substrate as long as the substrate has a self-supporting property and the substrate supports a polymer layer obtained by drying a coated film obtained by coating the polymerizable liquid crystal composition. In particular, when there is provided a laminating step of laminating two or more layers of polymer films obtained by drying coated films, the polymer layer obtained by drying the underlayer coated film is included in the substrate, and polymer layers obtained by drying coated films of the second and subsequent layers can be laminated sequentially on the polymer layer obtained by drying the lower layer coated film.

In the present invention, the substrate has preferably a plastic property from the viewpoint of carrying out production in roll-to-roll.

The substrate may or may not be transparent. Among them, the substrate is preferably a transparent plastic resin film. However, when a step of peeling off the substrate is included, transparency is not necessary. The haze of the substrate is preferably 3% or less, more preferably 1% or less. The substrate may be a phase difference plate such as a λ/2 plate that is produced with a management of production step so as to satisfy prescribed optical properties, or the substrate may be a polymer film or the like which cannot be used as a prescribed phase difference plate because of large variation in in-plane retardation, specifically, when performing representation by variation in in-plane retardation Re (1000) at the wavelength of 1000 nm, the variation in Re (1000) is 20 nm or more, or 100 nm or more. In addition, no particular limitation is imposed on in-plane retardation of the substrate, and there can be used, for example, a phase difference plate or the like having in-plane retardation Re (1000) at a wavelength 1000 nm being from 800 to 13000 nm.

Examples of the polymer films having high transmittance for visible light include various polymer films for an optical film used as a member of display devices such as liquid crystal display devices. Examples of the transparent plastic resin films include films containing a polyester such as polyethylene terephthalate (PET), polybutylene terephthalate or polyethylene naphthalate (PEN); polycarbonate (PC), polymethyl methacrylate; polyolefine such as polyethylene or polypropylene; polyimide or triacetyl cellulose (TAC), as a main component. Among these, a film containing polyethylene terephthalate and/or triacetyl cellulose as a main component is preferable, and in the production method of the present invention, a film containing polyethylene terephthalate as a main component is more preferable. Meanwhile, the main component means a component that occupies 50% by mass or more of the film.

The material for forming the substrate is determined depending on whether an optically isotropic substrate or an optically anisotropic substrate is to be selected. In the case of an optically isotropic substrate, generally, glass or cellulose ester is used. In the case of an optically anisotropic substrate, generally, synthetic polymer (for example, polycarbonate, polysulfone, polyether sulfone, polyacrylate, polymethacrylate, or norbornene resin) is used. However, according to the production of a film by (1) using a retardation raising agent, (2) lowering the degree of acetylation of cellulose acetate, or (3) using a cooling and dissolving method, as described in European Patent No. 0911656 A2, an optically anisotropic (with high retardation) cellulose ester film can also be produced. A substrate made of a polymer film is preferably obtained by a solvent casting method.

In order to obtain an optically anisotropic substrate, a polymer film is preferably subjected to a stretching treatment. When an optically uniaxial substrate is produced, it suffices that usual uniaxial stretching treatment or biaxial stretching treatment is carried out. When an optically biaxial substrate is produced, unbalance biaxial stretching treatment is preferably carried out. In the unbalance biaxial stretching, a polymer film is stretched at a prescribed magnification (for example, from 3 to 100%, preferably from 5 to 30%) in a certain direction, and is stretched at the equal or larger magnification (for example, from 6 to 200%, preferably from 10 to 90%) in the direction perpendicular thereto. Stretching treatments in two directions may be carried out simultaneously. It is preferable that the stretching direction (in an unbalance biaxial stretching, the direction in which the stretching magnification is higher) and the slow axis in the plane of the film after the stretching are in the substantially same direction. The angle formed between the stretching direction and the slow axis is preferably less than 10°, more preferably less than 5°, and most preferably less than 3°.

The optically anisotropic substrate can also be used as a λ/2 plate by imposing an intended phase difference. In such an optically anisotropic substrate, the phase difference is preferably from 350 nm to 700 nm, more preferably from 400 to 650 nm.

The substrate has a thickness of preferably from 30 μm to 200 μm, more preferably from 100 to 200 μm. By setting the thickness to be the value, the infrared light reflection layer can be stably produced, and even when the laminated body sandwiched by glass plates includes the substrate, film cracks and wrinkles can be suppressed including peripheral portions of the resin film, and thus the reflection unevenness of the obtained laminated glass can be suppressed more effectively.

In order to improve the adhesion between the substrate and a layer provided thereon (an adhesion layer, an alignment film or a polymer layer obtained by drying a coated film of the polymerizable liquid crystal composition), the substrate may be subjected to a surface treatment (such as a glow discharge treatment, a corona discharge treatment, an ultraviolet (UV) treatment or a flame treatment). An ultraviolet absorber may be added to the substrate. An adhesion layer (under coat layer) may be provided on the substrate. The adhesion layer is described in Japanese Patent Application Laid-Open Publication No. 7-333433. The thickness of the adhesion layer is preferably from 0.1 to 2 μm, more preferably from 0.2 to 1 μm.

The film produced by the production method of the present invention may have an under coat layer on the side of the polymer layer obtained by drying a coated film of the polymerizable liquid crystal composition. This is because the polymer layer obtained by drying a coated film of the polymerizable liquid crystal composition is, usually, provided preferably on the substrate, but depending on a substrate, there may be such a case where the polymer layer obtained by drying a coated film of the polymerizable liquid crystal composition is preferably provided on the provided under coat layer.

Examples of the materials that can be used for forming an under coat layer include acrylic ester copolymer, polyvinylidene chloride, styrene-butadiene rubber (SBR), aqueous polyester, and the like. In an embodiment in which the surface of an under coat layer adheres to an intermediate film, adhesion properties between the under coat layer and the intermediate layer is preferably good, and from the viewpoint, the under coat layer also preferably contains polyvinyl butyral resin together with the above-described material. Furthermore, as described above, in the under coat layer, adhesion force needs to be suitably adjusted, and thus the layer is preferably cured using suitably a curing agent such as, dialdehydes such as glutaric aldehyde or 2,3-dihydroxy-1,4-dioxane or boric acid. The addition amount of the curing agent is preferably from 0.2 to 3.0% by mass of dry mass of the under coat layer.

The under coat layer is preferably formed on the surface of a substrate of a transparent plastic resin film or the like by coating. No particular limitation is imposed on the coating method in this case, and a known method can be used.

The thickness of the under coat layer is preferably from 0.05 to 0.5 μm.

The film produced by the production method of the present invention may have an alignment layer between the polymer layer obtained by drying a coated film of the polymerizable liquid crystal composition and the substrate. When the substrate is peeled off from the film produced by the production method of the present invention, the alignment layer can also be peeled off together at the time.

The alignment layer needs to be adjacent to the polymer layer obtained by drying a coated film of the polymerizable liquid crystal composition when the polymer layer obtained by drying a coated film of the polymerizable liquid crystal composition is formed, and thus the alignment layer is preferably provided between the polymer layer obtained by drying a coated film of the polymerizable liquid crystal composition, and the substrate or the under coat layer. However, the under coat layer may have a function of the alignment layer. Furthermore, the alignment layer may be positioned between the polymer layers obtained by drying coated films of the polymerizable liquid crystal composition.

The alignment layer can be provided by a technique such as a rubbing treatment of an organic compound (preferably polymer), oblique evaporation of an inorganic compound or formation of a layer having a micro group. Furthermore, there are also known alignment layers that generate an alignment function by application of an electric field, application of a magnetic field or a light irradiation. The alignment layer is preferably formed on the surface of a polymer film by a rubbing treatment. The alignment layer is preferably peeled off together with the substrate as described above.

In the production method of the present invention, the polymerizable liquid crystal composition is preferably prepared as a coating liquid in which the above-mentioned respective materials are dissolved or dispersed in (D) the solvent. In the coating step of the production method of the present invention, after completing the polymerizable liquid crystal composition as a coating liquid, preferably the composition is coated on the surface of the substrate such as a polymer film, a glass plate or a quartz plate, or if necessary, on the surface of the alignment layer formed on the substrate.

The coating of the polymerizable liquid crystal composition can be carried out by various methods such as a wire bar coating method, an extrusion coating method, a direct gravure coating method, a reverse gravure coating method or a die coating method. In addition, the coated film can also be formed, through the use of an inkjet apparatus, by ejecting the curable liquid crystal composition from a nozzle.

In the production method of the present invention, the coating amount is preferably adjusted so that the thickness of the polymer layer obtained by drying a coated film of the polymerizable liquid crystal composition becomes 1 μm to 8 μm after the drying, and the coating amount is more preferably adjusted so that the thickness becomes 3 to 7 μm.

(Drying Step)

The production method of the present invention has a drying step of drying a coated film of the polymerizable liquid crystal composition formed in the coating step. When the solvent contained in the polymerizable liquid crystal composition is removed by the drying step, the wind unevenness in drying the film to be obtained can be suppressed in the present invention, by performing control or the like of the type and amount of the alignment controlling agent in the polymerizable liquid crystal composition. The drying step is preferably a drying step of applying air. However, the wind unevenness in drying a film is generated not only in the case where air is actively applied for carrying out drying in the drying step, but also for example, in the case of passing through a drying zone while conveying a substrate on which a coated film is formed.

In the present invention, in order to suppress the wind unevenness in drying, it is more preferable to improve leveling properties of a coating liquid by suitably adjusting the dynamic surface tension of the coating liquid.

In the method of producing a film of the present invention, it is preferable to control the surface tension 100 msec after the formation of gas-liquid interface of the polymerizable liquid crystal composition, to be from more than 24.5 mN/m to 28.0 mN/m or less by suitably combining the type and amount of the polymerizable liquid crystal compound, the alignment controlling agent and the solvent to be mentioned later, from the viewpoint of sufficiently improving the wind unevenness in drying of the film to be obtained.

The surface tension 100 msec after the formation of gas-liquid interface of the polymerizable liquid crystal composition is more preferably more than 24.5 mN/m and 27.3 mN/m or less.

When high-speed coating/drying are carried out, usually, a slot die suitable for high-speed coating is used, but, from the restriction of an apparatus configuration, the slot die has a property of not being suitable for a coating liquid of high viscosity/high density. Therefore, it is preferable to make the density of a coating liquid smaller than conventional one, and in proportion to it, to increase the coating amount. However, with the increase in the coating amount, the drying energy is also required to be increased, and thus the wind unevenness in drying tends to be generated more easily in the film. The method of producing a film of the present invention is useful also in such a case.

It is preferable to carry out the drying step after the coating step, and to carry out the drying step after the coating step and before an alignment step.

No particular limitation is imposed on a technique of forced-air drying that supplies air to a coated film formed in the coating step, and a drying apparatus of a roller conveying dryer system or an air floating dryer system that is used as a conventional technology can be used. Drying apparatuses of any system are common in that the supply of dry air to the surface of a coated film makes the coated film dry.

No particular limitation is imposed on the temperature near the film in the drying step, and a unit configured to heat the coated film may be provided. In the present invention, the temperature near the film in the drying step is preferably from 20 to 50° C., more preferably room temperature from the viewpoint of production cost.

In the drying step, it is preferable to apply dry air to the coated film on the film surface in the film convey direction.

The time period of applying air to the coated film in the drying step is, for example, preferably from 10 to 120 seconds, more preferably from 15 to 60 seconds, and particularly preferably from 20 to 40 seconds.

For the purpose of a high-speed coating/drying line, there may be used together a method in which the coated film is dried by condensation and collection of the solvent through the use of a condensation plate without applying air in an initial drying step (also called condensation dryer drying or heat drying). As the condensation dryer drying, the method described in Japanese Patent Application Laid-Open Publication No. 2008-197170 can be employed.

Furthermore, in the drying step, a method other than applying air to the formed coated film may be used together, and the drying step can be carried out by heating, supplying air or the like, without limitation. When heating is carried out, the application of heat at 10° C. to 60° C. for 5 seconds to 600 seconds is preferable, the application of heat at 15° C. to 55° C. for 5 seconds to 200 seconds is more preferable, and the application of heat at 20° C. to 50° C. for 10 seconds to 100 seconds is particularly preferable.

Aligning Step:

The production method of the present invention preferably includes a step of applying heat to the coated polymerizable liquid crystal composition to thereby align the polymerizable liquid crystal compound and to put the composition into a state of a cholesteric liquid crystal phase.

In order to bring the compound into the transition temperature to the cholesteric liquid crystal phase, heat is applied to the coated polymerizable liquid crystal composition. As to the method for applying heat, for example, by heating the coated composition once up to the temperature of an isotropic phase, and after that, cooling or the like to the cholesteric liquid crystal phase transition temperature, the compound is stably put into a state of the cholesteric liquid crystal phase. The liquid crystal phase transition temperature of the polymerizable liquid crystal composition is preferably in the range of 10 to 250° C., more preferably in the range of 10 to 150° C., from the viewpoint of production aptitude or the like. When the temperature is 10° C. or higher, it is easy to set the compound to be in the temperature range that gives the liquid crystal phase, and the temperature of 200° C. or lower is preferable from the viewpoint of consumption or the like of thermal energy and is further advantageous in view of deformation, degeneration or the like of the substrate.

In order to align the polymerizable liquid crystal compound to thereby put the compound into the state of the cholesteric liquid crystal phase, it is preferable to apply heat at 50° C. to 150° C. for 5 seconds to 600 seconds, is more preferable to apply heat at 70° C. to 130° C. for 5 seconds to 480 seconds, and is particularly preferable to apply heat at 80° C. to 100° C. for 30 seconds to 300 seconds.

Irradiation Step:

The production method of the present invention preferably includes an irradiation step of forming an infrared light reflection layer by irradiating the polymerizable liquid crystal composition with actinic radiation to thereby fix the cholesteric liquid crystal phase.

As the actinic radiation, ultraviolet rays or the like can be used. In an embodiment in which ultraviolet irradiation is used, a light source such as an ultraviolet lamp is used. In the step, the cholesteric liquid crystal phase is fixed by ultraviolet ray irradiation and the infrared light reflection layer is formed.

The irradiation energy amount of the actinic radiation is not particularly limited, but, generally, is preferably about 100 mJ/cm$^2$ to 800 mJ/cm$^2$. Furthermore, the time period of irradiating the polymerizable liquid crystal composition with actinic radiation is not particularly limited, and will be determined from the viewpoint of both sufficient strength of a cured film and productivity.

In order to accelerate the reaction of fixing the cholesteric liquid crystal phase, the actinic radiation irradiation may be carried out under heating conditions. In addition, the temperature in performing irradiation with actinic radiation is preferably maintained in the temperature range that causes the cholesteric liquid crystal phase to be expressed so that the cholesteric liquid crystal phase is not disturbed. Furthermore, the oxygen concentration in atmosphere is involved in the degree of polymerization, and thus when an intended polymerization degree is not achieved in the air and the film strength is insufficient, the oxygen concentration in the atmosphere is preferably lowered by a method such as nitrogen substitution. The oxygen concentration is preferably 10% or less, more preferably 7% or less, and most preferably 3% or less.

In the irradiation step, the cholesteric liquid crystal phase is fixed and the infrared light reflection layer is formed. Here, as to a state where the liquid crystal phase is "fixed," a state where the alignment of the liquid crystal compound that gives the cholesteric liquid crystal phase is maintained is the most typical and preferable mode. However, the state where the liquid crystal phase is "fixed" is not limited to this, but, specifically, means a state where the fixed alignment form can continue to be stably maintained without flowability in the layer and without the generation of change in the alignment form by an external field and external force in the temperature range of usually 0° C. to 50° C., or under more sever conditions, of −30° C. to 70° C. In the present invention, the alignment state of cholesteric liquid crystal phase is fixed by the actinic radiation irradiation.

In the present invention, it suffices that optical properties of the cholesteric liquid crystal phase have only to be held in the layer, and it is unnecessary any more that the liquid crystal composition in the infrared light reflection layer finally shows liquid crystalline properties. For example, the liquid crystal composition may have been put into a high-molecular-weight state by a curing reaction to thereby lose liquid crystalline properties.

Laminating Step:

The production method of the present invention preferably includes a laminating step, in which the coating step and the drying step are repeated at least once on the polymer layer obtained by drying the coated film while changing at least one of the type and addition amount of components contained in the polymerizable liquid crystal composition to thereby laminate two or more layers of the polymer layers obtained by drying the coated film. When a laminated body of two or more polymer layers obtained by drying the coated film is obtained, the production method of the present invention can also be employed preferably. Since the wind unevenness in drying is suppressed in the production method of the present invention, coating unevenness and alignment unevenness caused by thickness unevenness of a lower layer are hardly induced, which is preferable.

The method of producing a film of the present invention preferably has steps of forming a layer that reflects right circularly polarized light and of forming a layer that reflects left circularly polarized light, by drying the coated film, at least once respectively.

[Film]

The film of the present invention is characterized by being obtained by the method of producing a film of the present invention.

In the film of the present invention obtained according to the production method of the present invention, the wind unevenness is suppressed, and thus, when used as an infrared light reflection film, portions having high reflectivity or low reflectivity caused by thickness unevenness are hardly formed, thereby capable of suppressing local unevenness of a heat shielding property and capable of suppressing unevenness that can be visually observed by the difference in the reflectivity.

<Infrared Light Reflection Film>

In the film produced by the method of producing a film of the present invention, the polymer layer obtained by drying the coated film is preferably an infrared light reflection layer that reflects infrared light having a wavelength of 800 nm or longer.

The film of the present invention is preferably an infrared light reflection film. The use of the production method of the present invention makes it possible to obtain an infrared light reflection film in which optical properties are good and unevenness and an alignment defect are suppressed.

(Reflection Wavelength)

It is known that the wavelength in a specific region of light reflected from the infrared light reflection film produced by the production method of the present invention can be shifted by various factors of production method, and the wavelength can be shifted by conditions such as temperature, illuminance and irradiation time in fixing the cholesteric liquid crystal phase, in addition to the addition concentration of the chiral agent.

The method of producing a film of the present invention can be used more preferably when an infrared light reflection film that reflects infrared light of 800 nm or longer is produced.

The method of producing a film of the present invention can preferably be used when an infrared light reflection film, in which a reflection center wavelength is 950 to 2000 nm, is produced, and can more preferably be used when an infrared light reflection film, in which a reflection center wavelength is 950 to 1400 nm, is produced. In the reflection wavelength region, usually, light in the zone of 100 to 250 nm is frequently reflected, and the average value of the reflection wavelengths is referred to as the reflection center wavelength.

The infrared light reflection film is produced by the method of producing a film of the present invention, which preferably reflects infrared light having a wavelength of 800 nm or more, and more preferably reflects 30% or more of entering light in the infrared light region of 800 nm to 2000 nm. Hereinafter, the infrared light reflection film will be explained.

(Configuration)

Figure 2:
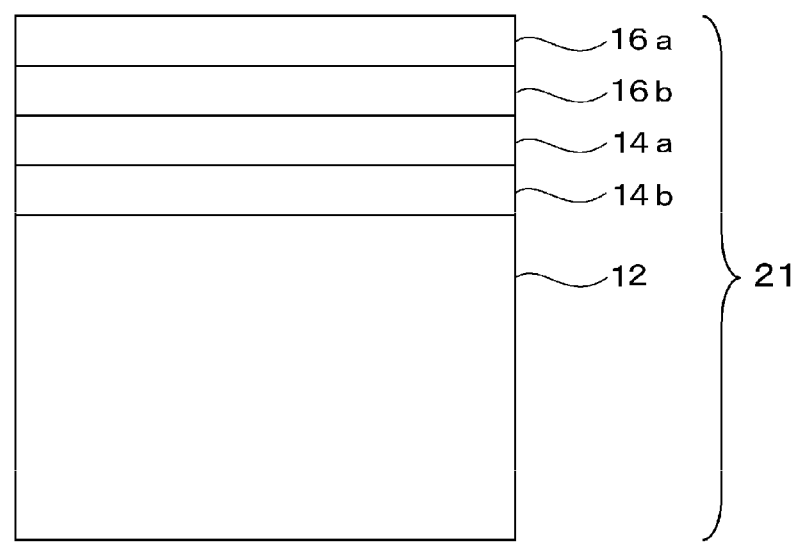
FIG. 2 is a schematic view showing a cross-section of another example of a film produced by the method of producing a film of the present invention.

Examples of films produced by the production method of the present invention are shown in FIG. 1 and FIG. 2, respectively.

A film 21 shown in FIG. 1 has an infrared light reflection layer 14a constituted by fixing a cholesteric liquid crystal phase formed on one surface of a resin film 12. A film 21 shown in FIG. 2 additionally has, furthermore thereon, infrared light reflection layers 14b, 16a and 16b constituted by fixing a cholesteric liquid crystal phase. The infrared light reflection film is not limited to these modes, but a form in which three or more layers of the infrared light reflection layer are formed is preferable, and a form in which six or more layers of the infrared light reflection layer are formed is more preferable. The infrared light reflection layer may be formed in an odd number.

In the film 21 shown in FIGS. 1 and 2, respectively, each of infrared light reflection layers is constituted by fixing the cholesteric liquid crystal phase, and thus, exhibits light-selecting reflection properties that reflect light of a specific wavelength, on the basis of the spiral pitch of the cholesteric liquid crystal phase. For example, when adjacent infrared light reflection layers (14a and 14b, 16a and 16b) have spiral pitches of the same degree and exhibit optical rotation properties that are in directions opposite to each other, each of left and right circularly polarized lights with approximately the same wavelengths can be reflected, which is preferable. For example, one example of the film 21 in FIG. 2 includes an example in which, among infrared light reflection layers 14a and 14b, the infrared light reflection layer 14a is formed of a liquid crystal composition containing a chiral agent of right rotation properties and the infrared light reflection layer 14b is formed of a liquid crystal composition containing a chiral agent of left rotation properties and, in infrared light reflection layers 14a and 14b, spiral pitches are approximately the same degree of d14 nm.

Furthermore, one example of each in the film 21 in FIG. 2 includes an example, in which the relationship between infrared light reflection layers 14*a* and 14*b* is the same as that in the above example of the film 21, the infrared light reflection layer 16*a* is formed of a liquid crystal composition containing a chiral agent of right rotation properties, the infrared light reflection layer 16*b* is formed of a liquid crystal composition containing a chiral agent of left rotation properties, spiral pitches of light reflection layers 16*a* and 16*b* are approximately the same degree of d16 nm, and d14≠d16 is satisfied. The film 21 that satisfies the conditions shows the effect the same as that in the above example of film 21, and furthermore, exhibits light reflection properties of a broader zone because the wavelength zone of light to be reflected is widened by infrared light reflection layers 16*a* and 16*b*.

The film produced by the production method of the present invention preferably exhibits selective reflection properties based on the cholesteric liquid crystal phases of the respective layers. The infrared light reflection film may have a layer constituted by fixing a cholesteric liquid crystal phase of any of right twisting and left twisting. When the film has layers in which each of right twist and left twist cholesteric liquid crystal phases with the same spiral pitch is fixed, a selective reflectivity for light of a specific wavelength becomes high, which is preferable. Furthermore, when the film has a plurality of pairs of layers in which right twist and left twist cholesteric liquid crystal phases with the same spiral pitch are fixed, respectively, the selective reflectivity is enhanced and the selective reflection wavelength zone is made into a wider zone, which is preferable.

The direction of rotation of a cholesteric liquid crystal phase can be adjusted by the type of a rod-like liquid crystal, or the type of a chiral agent to be added, and the spiral pitch can be adjusted by the concentration of these materials.

(Characteristics)

In addition, the total thickness when the infrared light reflection film is a laminated body having two or more infrared light reflection layers is not particularly limited, and, in an embodiment in which the film includes four or more infrared light reflection layers obtained by fixing a cholesteric liquid crystal phase and exhibits widely light reflection properties, that is, heat shielding properties in an infrared reflective zone, the thickness of each layer will be about 3 to 6 μm and the total thickness d3 of the infrared light reflection film will be usually from 15 to 40 μm.

Furthermore, no particular limitation is imposed on the selective reflection wavelength of one infrared light reflection layer (or, when a plurality of light reflection layers are included, each of light reflection layers) of the infrared light reflection film. By adjusting the spiral pitch in accordance with the intended use, reflection properties for light of an intended wavelength can be given. One example is that at least one layer is a so-called infrared reflection film that reflects a part of light in an infrared light wavelength zone of from 800 nm to 2000 nm to thereby exhibit heat-shielding properties. In one example of the infrared light reflection film, preferably reflection of 80% or more, more preferably reflection of 90% or more, of sunlight having a wavelength of 900 nm to 1160 nm is possible. When a window film is made through the use of the performance, high heat-shielding performance of 0.7 or less in the shielding coefficient defined in JIS A-5759 (film for building window glasses) can be achieved.

The infrared light reflection film can achieve low haze. Specifically, haze of less than 0.30% can be achieved in the infrared light reflection film. The haze of the infrared light reflection film is preferably 0.50% or less, more preferably 0.40% or less, particularly preferably 0.30% or less. In addition, it is preferable that haze satisfies the above-mentioned preferable range, and brittleness (percentage of elongation at breakage) of the infrared light reflection film to be described later is 2% or more.

For an infrared light reflection films having been stuck to a window or the like, transparency is required and lower haze is preferable. The haze is preferably 0.30% or less. Haze can be measured in accordance with JIS K 7136:2000 (Plastics—Determination of haze for transparent materials).

(Form)

The form of the infrared light reflection film may be an extended form in a sheet or a wound form in a roll, and a wound form in a roll is also preferable. That is, it is more preferable that the infrared light reflection film of the present invention can maintain good optical properties when winding and feeding are repeated in a production process and, furthermore, can maintain good optical properties even when the film is stored and conveyed in a wound state in a roll after the production.

The infrared light reflection film may be a member that has self-supporting properties such that the film itself can be used as a window material, or a member that has no self-supporting properties and is used by being stuck or the like to a self-supporting substrate such as a glass plate.

For example, when a cholesteric liquid crystal phase is to be fixed, one layer brings about only any one of right or left circularly polarized light, which exhibits a reflection performance of 50% at a maximum. By coating and laminating a layer that reflects right circularly polarized light and a layer that reflects left circularly polarized light, the reflection performance can be enhanced up to 100% at a maximum. The width of a reflection zone is, usually, 100 to 150 nm, but by using a material that gives high birefringence Δn to a cholesteric layer, or by providing a concentration distribution of a chiral agent in the film cross-section direction for the chiral agent inside the produced film, the reflection zone can be widened up to about 150 to 300 nm.

(Intended Use)

Intended use of the infrared light reflection film is not particularly limited. The infrared light reflection film is preferably an infrared light reflection film of a window material for automobiles or an infrared light reflection film of a window material for buildings.

In addition, the infrared light reflection film may be used while being stuck to the surface of a glass plate, a plastic substrate or the like. In such an embodiment, the surface of the heat-shielding member to be stuck to a glass plate or the like is preferably adhesive. In the present embodiment, the infrared light reflection film has preferably an adhesive layer, an easily adhesive layer or the like, capable of being stuck to the surface of a substrate such as a glass plate. Naturally, the infrared light reflection film having non-adhesiveness may be stuck to the surface of a glass plate by using an adhesive agent.

The infrared light reflection film preferably shows a heat-shielding property for sunlight, and preferably reflects effectively infrared rays of 700 nm or longer in sunlight.

The infrared light reflection film can be used as a heat-shielding window itself for vehicles or buildings, or as a sheet or film used for a window of vehicles or buildings for the purpose of giving heat-shielding properties. In addition, the film can be used as freezer show cases, materials for agricultural houses, reflection sheets for agriculture, films for solar cells, or the like. Among them, the use of the infrared light reflection film as an infrared light reflection film of a window material for automobiles or of a window material for buildings is preferable, from the viewpoint of characteristics such as high visible light transmittance and low haze.

Furthermore, the infrared light reflection film may be used as a heat-shielding member by being incorporated inside a laminated glass.

The heat-shielding member is stuck to windows of constructions such as houses and office buildings, or to windows of vehicles such as automobiles, as a member for shielding heat of solar radiation. Alternatively, as a member itself for shielding heat of solar radiation (for example, glass for shielding heat, film for shielding heat), the film can be subjected to the intended use.

EXAMPLES

Hereinafter, characteristics of the present invention will be explained more specifically by mentioning Examples and Comparative Examples (It should not be construed that Comparative Examples are known technologies). Material, use amount, percentage, treatment content, treatment procedure, and the like can be suitably modified unless departing from the gist of the present invention. Accordingly, the scope of the present invention should not be construed in a limited way by specific examples shown below.

Examples 1 to 6 and Comparative Examples 1 to 10

Preparation of Polymerizable Liquid Crystal Composition (R1)

By mixing a polymerizable liquid crystal molecule A, an alignment controlling agent, a chiral agent, a polymerization initiator and a solvent described below, coating liquids of compositions below were prepared. Each of obtained coating liquids was referred to as a polymerizable liquid crystal composition (R1) of each of Examples and Comparative Examples. Measurement results of the dynamic surface tension of the obtained polymerizable liquid crystal composition (R1) through the use of Auto Dynamic Surface Tensiometer BP-D4 manufactured by Kyowa Interface Science Co., LTD are shown in Table 1 below.

| | |
|---|---|
| Polymerizable liquid crystal molecule A below | 100 parts by mass |
| (trade name: RM-257, purchased from Merck) | |
| Alignment controlling agent described in Table 1 below | in amount described in Table 1 below |
| Chiral agent described below | 5.0 parts by mass |
| (trade name: LC-756, purchased from BASF) | |
| Polymerization initiator IRGACURE819 | 3 parts by mass |
| (manufactured by Ciba Japan KK) | |
| Solvent | in an amount that gives solute concentration of 25% by mass |
| (methyl ethyl ketone) | |

Polymerizable liquid crystal molecule A (produced by synthesis):

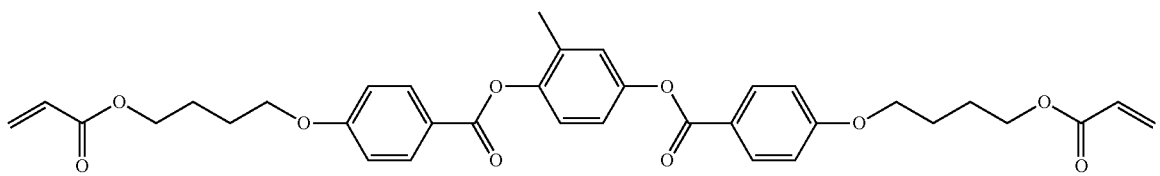 [SMILES: C=CC(=O)OCCCCOc1ccc(C(=O)Oc2ccc(OC(=O)c3ccc(OCCCCOC(=O)C=C)cc3)c(C)c2)cc1]

Alignment controlling agent:

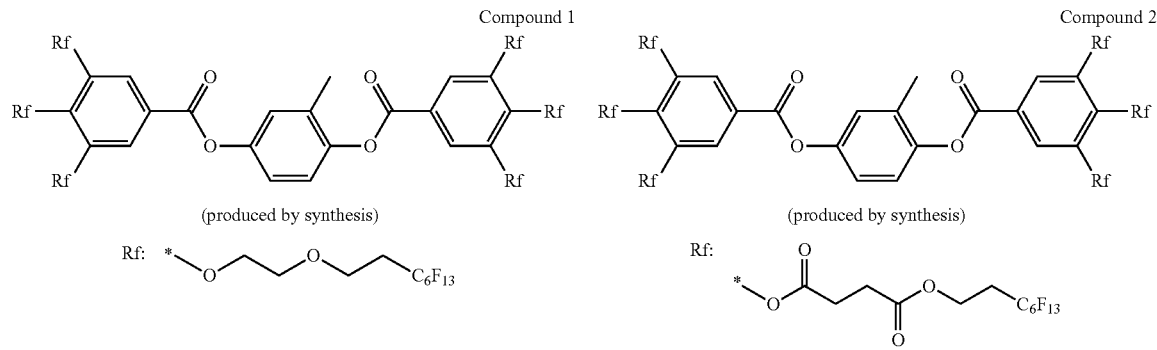

-continued
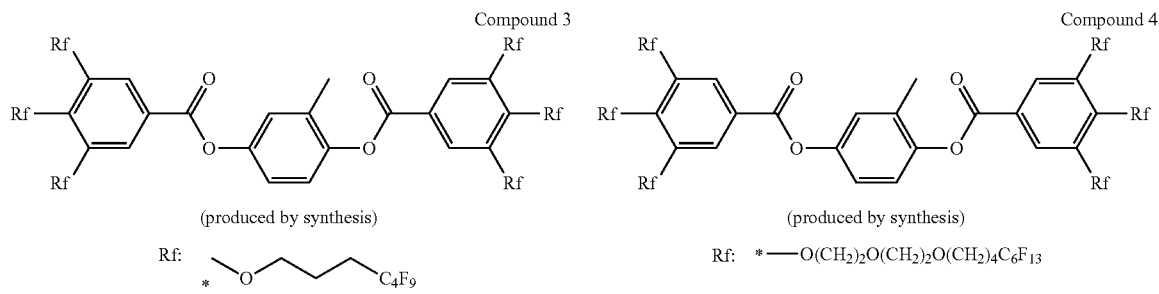
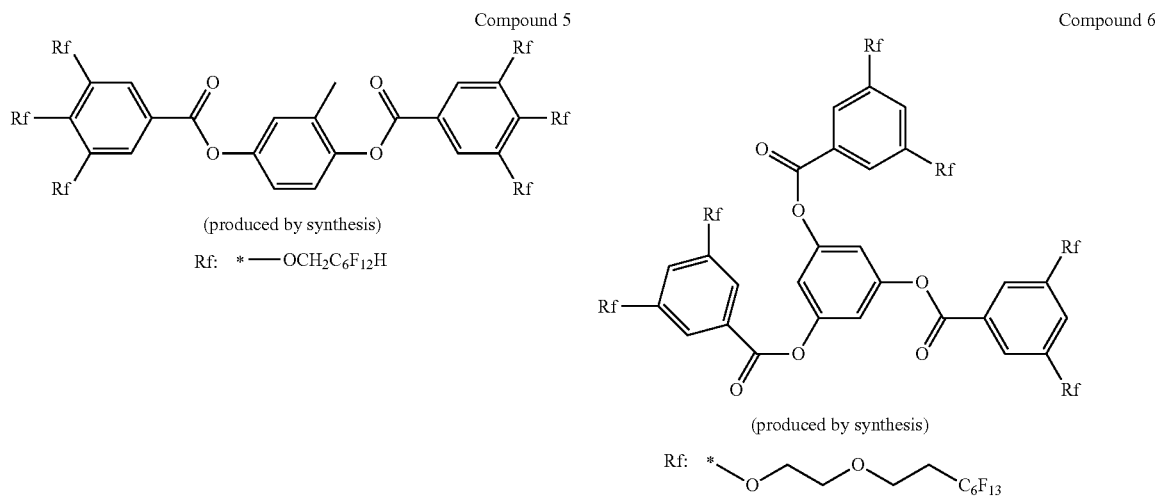
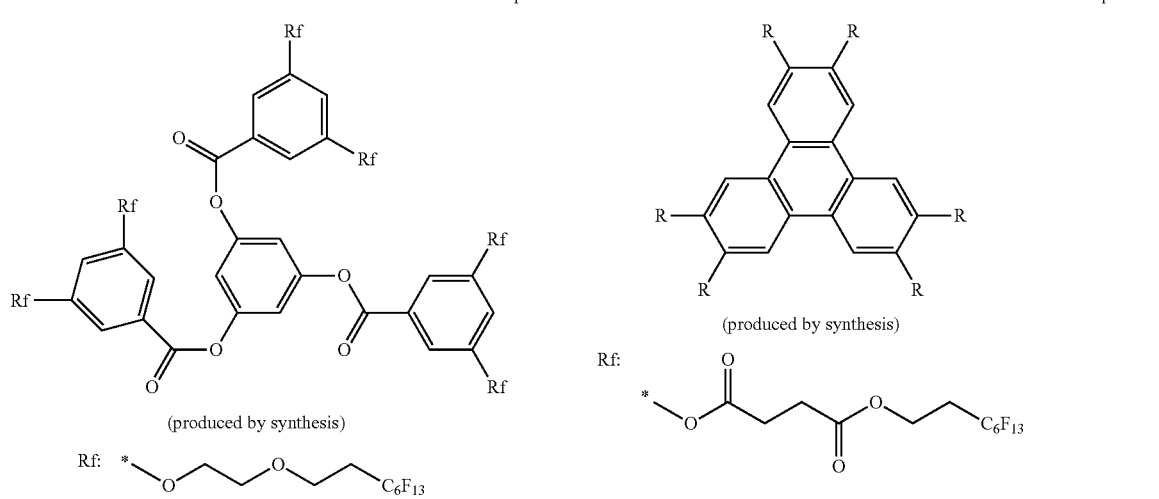
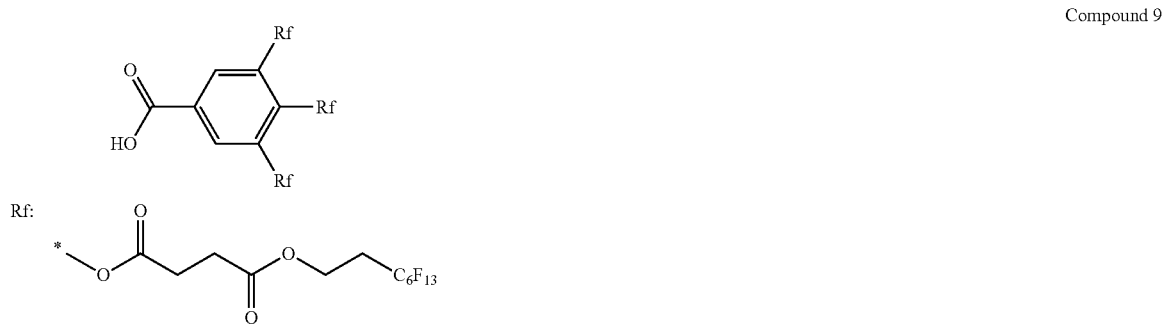

Compound 10

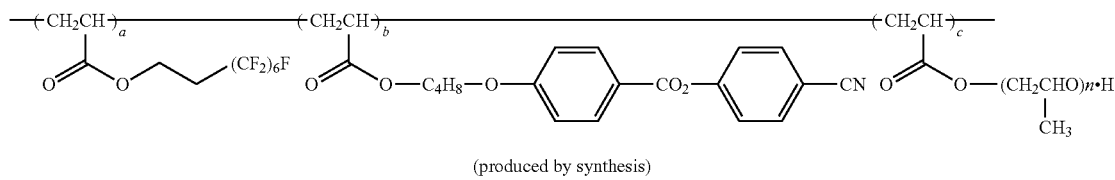

(produced by synthesis)

a/b/c = 20/27/53

<Production of Film>
(Preparation of Polymerizable Liquid Crystal Composition)

A coating liquid (L1) being a polymerizable liquid crystal composition was prepared in the same manner as the above except that the chiral agent (A) in the coating liquid (R1) being a polymerizable liquid crystal composition was replaced with 3.0 parts by mass of LC-756 (manufactured by BASF).

Furthermore, a coating liquid (R2) was prepared in the same manner as the above except that the amount of the chiral agent (A) in the coating liquid (R1) containing the polymerizable liquid crystal was changed to 4.0 parts by mass.

Moreover, a coating liquid (L2) was prepared in the same manner as the above except that the amount of the chiral agent LC-756 in the coating liquid (L1) containing the polymerizable liquid crystal was replaced with 2.4 parts by mass.

(Preparation of Coating Liquid for Under Coat Layer)

A coating liquid (S1) for an under coat layer having a composition shown below was prepared.

Composition of coating liquid (S1) for under coat layer:

| | |
|---|---|
| Acrylic ester resin Jurymer ET-410 (manufactured by TOAGOSEI CO., LTD., solid content concentration 30%) | 50 parts by mass |
| Methanol | 50 parts by mass |

(Preparation of Coating Liquid for Alignment Layer)

A coating liquid (H1) for an alignment layer having a composition shown below was prepared.

Composition of coating liquid (H1) for alignment layer:

| | |
|---|---|
| Modified polyvinyl alcohol PVA203 (manufactured by Kuraray Co., Ltd.) | 10 parts by mass |
| Glutaric aldehyde | 0.5 parts by mass |
| Water | 371 parts by mass |
| Methanol | 119 parts by mass |

(Coating, Drying and Formation of Film)

On the surface of a PET film (no under coat layer, manufactured by FUJIFILM Corporation, thickness: 50 μm, size: 320 mm×400 mm), the coating liquid (S1) for an under coat layer was coated so as to give a dried film thickness of 0.25 μm by using a wire bar. After that, by heating at 150° C. for 10 minutes, drying and solidification, an under coat layer was formed.

Next, on the formed under coat layer, the coating liquid (H1) for an alignment layer was coated at a coating speed of 25 m/min so as to give a dried film thickness of 1.0 μm by using a wire bar. After that, by heating at 100° C. for 2 minutes, drying and solidification, an alignment layer was formed. The alignment layer was subjected to a rubbing treatment (rayon cloth, pressure: 0.1 kgf, rotation number: 1000 rpm, conveyance speed: 10 m/min, number of times: 1 round).

Next, by using prepared coating liquids (R1), (R2), (L1) and (L2) containing a polymerizable liquid crystal, the cholesteric liquid crystal phase was fixed by a procedure below and thus a liquid crystal film constituted by fixing the cholesteric liquid crystal phase being an infrared reflection layer was produced.

(1) Each of coating liquids containing a polymerizable liquid crystal was coated on the alignment layer on the PET film at a coating speed of 25 m/min at room temperature so as to give a dried film thickness of 6 μm by using a wire bar.

(2) While conveying the PET film with rollers, drying air was applied to the coated film on the surface of the film at room temperature along the conveyance direction of the film for drying for 30 seconds and thus the solvent was removed. After that, the resultant film was dried in an atmosphere at 125° C. for 2 minutes, and then, it was formed into a cholesteric liquid crystal phase at 95° C. Next, through a use of an electrodeless lamp "D valve" (90 mW/cm) manufactured by Fusion UV Systems, Inc., UV irradiation was carried out at an output of 60% for 6 to 12 seconds to fix the cholesteric liquid crystal phase, and a liquid crystal film (infrared reflection layer) constituted by fixing the cholesteric liquid crystal phase was prepared.

(3) After cooling the resultant liquid crystal film to room temperature, by repetition of the above steps (1) and (2), films of the respective Examples and Comparative Examples, obtained by formation of liquid crystal films of the cholesteric liquid crystal phase laminated in four layers on PET, were prepared.

Coating liquids were coated in order of (R1), (R2), (L1) and (L2).

<Evaluation>

The wind unevenness in drying, liquid crystal alignment and other surface conditions of the respective Examples and Comparative Examples were evaluated by methods below.

(Wind Unevenness in Drying)

Stripe-like unevenness, which can be visually recognized when a sample was set between two polarizing plates arranged in a crossed nicol state and observed, was defined as wind unevenness in drying. The wind unevenness in drying was determined in accordance with the standard below.

A: no unevenness can be visually recognized
B: almost no unevenness can be visually recognized
C: unevenness can be visually recognized
D: severe unevenness can be recognized (Liquid Crystal Alignment)

Relative merits of liquid crystal alignment properties were determined from the presence or absence of an alignment defect when the film was observed by using a polarization microscope, in accordance with the standard below.

A: no alignment defect exists
B: almost no alignment defect exists
C: somewhat alignment defects exist
D: alignment defects exist in whole area
(Other Surface Conditions)

Surface conditions other than the drying unevenness and alignment defect were determined by setting a sample between two polarizing plates arranged in a crossed nicol state to be observed, in accordance with the standard below.

A: no unevenness can be visually recognized
B: almost no unevenness can be visually recognized
C: somewhat unevenness can be visually recognized
D: unevenness can be visually recognized Obtained results are listed in Table 1 below.

The column of mesogen skeleton (1') of alignment controlling agents in Table 1 denotes whether or not the agent has the structure below.

Mesogen Skeleton (1')

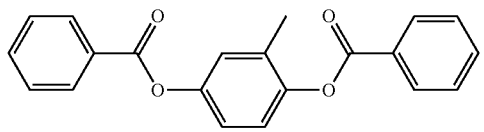

poor. Films in Comparative Examples 3 to 10 were produced using alignment controlling agents having structures outside the range of the alignment controlling agent defined in the present invention, and it was found that the result of the wind unevenness in drying of each of films was poor.

The peak of reflection wavelength of films obtained in the respective Examples was 900 nm.

While the present invention has been described in detail and with reference to specific embodiments thereof, it will be apparent to one skilled in the art that various changes and modifications can be made therein without departing from the spirit and scope thereof. All the publications referred to in the present specification are expressly incorporated herein by reference in their entirety. The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

TABLE 1

| | | | | | Polymerizable liquid crystal composition | | | | |
| | | Alignment control agent | | | | | Evaluation of film surface conditions | | |
| | Type Compound | Mesogen skeleton (1') | Fluorine number in fluoroalkyl group | Carbon number in L1 (L2) | Mixed amount relative to 100 parts by mass of liquid crystal (part by mass) | Dynamic surface tension (mN/m) | Wind unevenness in drying | Liquid Crystal Alignment | Other surface conditions |
|---|---|---|---|---|---|---|---|---|---|
| Example 1 | 1 | Present | 13 | 4 | 0.01 | 27.8 | B | B | B |
| Example 2 | 1 | Present | 13 | 4 | 0.03 | 27.1 | A | A | B |
| Example 3 | 1 | Present | 13 | 4 | 0.2 | 25.0 | A | B | C |
| Comp Ex. 1 | 1 | Present | 13 | 4 | 0.3 | 24.4 | A | D | D |
| Comp Ex. 2 | 2 | Present | 13 | 6 | 0.003 | 28.2 | C | B | B |
| Example 4 | 2 | Present | 13 | 6 | 0.005 | 27.9 | B | B | B |
| Example 5 | 2 | Present | 13 | 6 | 0.01 | 27.6 | B | B | B |
| Example 6 | 2 | Present | 13 | 6 | 0.03 | 27.0 | A | A | B |
| Comp Ex. 3 | 3 | Present | 9 | 3 | 0.03 | 29.1 | D | B | B |
| Comp Ex. 4 | 4 | Present | 13 | 8 | 0.03 | 29.3 | D | B | B |
| Comp Ex. 5 | 5 | Present | 12 | 1 | 0.03 | 29.0 | D | B | B |
| Comp Ex. 6 | 6 | Absent | 13 | 4 | 0.03 | 28.1 | C | B | B |
| Comp Ex. 7 | 7 | Absent | 13 | 4 | 0.03 | 28.3 | C | B | B |
| Comp Ex. 8 | 8 | Absent | 13 | 6 | 0.03 | 28.2 | C | B | B |
| Comp Ex. 9 | 9 | Absent | 13 | 6 | 0.03 | 28.5 | C | B | B |
| Comp Ex. 10 | 10 | Absent | — | — | 0.03 | 28.1 | C | D | D |

From Table 1, it was found that the use of the method of producing a film of the present invention made it possible to produce a film in which the wind unevenness in drying was suppressed, the liquid crystal alignment was good and other surface conditions were also good.

On the other hand, the film in Comparative Example 1 was produced under a condition such that the range of the alignment controlling agent exceeded the upper limit of the range of the present invention, and it was found that the liquid crystal alignment of the film was poor and other surface conditions of the film were also poor. The film in Comparative Example 2 was produced under a condition such that the range of the alignment controlling agent fell below the lower limit of the range of the present invention, and it was found that the result of the wind unevenness in drying of the film was

KEY TO THE NUMBERS

12: Substrate
14a,14b,16a,16b: Infrared light reflection layer (polymer layer obtained by drying a coating)
21: Film

The invention claimed is:
1. A method of producing a film comprising:
a coating step of coating, on a substrate, a polymerizable liquid crystal composition comprising a polymerizable liquid crystal compound, an alignment controlling agent capable of controlling alignment of the polymerizable liquid crystal compound, a polymerization initiator and a solvent; and a drying step of drying the coated film formed,
wherein the alignment controlling agent is a compound represented by general formula (1) below, and the alignment controlling agent is added in 0.005 to 0.2 parts by mass relative to 100 parts by mass of the polymerizable liquid crystal compound;

General formula (1)

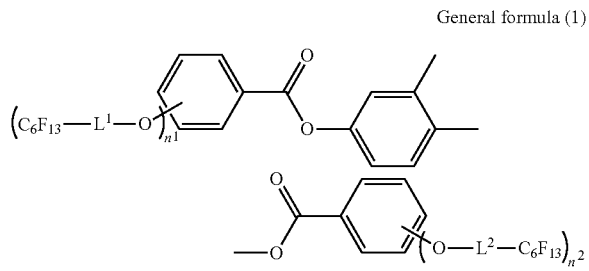

in general formula (1), each of $L^1$ and $L^2$ represents independently an alkylene group having 1 to 6 carbon atoms that may be substituted d with a fluorine atom, wherein one $CH_2$ or two or more $(CH_2)$s not adjacent to each other in the alkylene group may be replaced with —O—, —S—, —CO—, —OCO—, —COO—, —$NR^a$—, —$NR^a$CO—, —$CONR^a$—, —$NR^a SO_2$— or —$SO_2 NR^a$—, wherein $R^a$ represents hydrogen atom or an alkyl group having 1 to 5 carbon atoms; and each of $n^1$ and $n^2$ represents independently an integer of 3 or more, wherein structures in parentheses that exist in a plural number may be the same or different from each other.

2. The method of producing a film according to claim 1, wherein each of $C_6F_{13}$-$L^1$-O— and $C_6F_{13}$-$L^2$-O— at the terminals of the compound represented by general formula (1) is a group represented by either of general formulae below:

$C_6F_{13}$—$(C_qH_{2q})$—O—$(C_rH_{2r})$—O—

$C_6F_{13}$—$(C_qH_{2q})$—OCO—$(C_rH_{2r})$—COO— in the above formulae, q=2 and r represents an integer of 2 to 3.

3. The method of producing a film according to claim 1, wherein groups $C_6F_{13}$-$L^1$-O— existing in $n^1$ in a molecule are the same to each other, and groups $C_6F_{13}$-$L^2$-O— existing in $n^2$ in a molecule are the same to each other.

4. The method of producing a film according to claim 2, wherein groups $C_6F_{13}$-$L^1$-O— existing in $n^1$ in a molecule are the same to each other, and groups $C_6F_{13}$-$L^2$-O— existing in $n^2$ in a molecule are the same to each other.

5. The method of producing a film according to claim 1, wherein $n^1$ is 3 and $n^2$ is 3.

6. The method of producing a film according to claim 2, wherein $n^1$ is 3 and $n^2$ is 3.

7. The method of producing a film according to claim 3, wherein $n^1$ is 3 and $n^2$ is 3.

8. The method of producing a film according to claim 1, wherein the drying step is a drying step of applying air.

9. The method of producing a film according to claim 1, wherein the polymerizable liquid crystal compound is a rod-like polymerizable liquid crystal compound.

10. The method of producing a film according to claim 1; wherein the alignment controlling agent is a horizontal alignment agent capable of causing the polymerizable liquid crystal compound to be aligned horizontally.

11. The method of producing a film according to claim 1, wherein the substrate is polyethylene terephthalate film.

12. The method of producing a film according to claim 1, wherein a surface tension of the polymerizable liquid crystal composition 100 msec after forming a gas-liquid interface is controlled to be more than 24.5 mN/m and 28.0 mN/m or less.

13. The method of producing a film according to claim 1, comprising a laminating step of laminating two or more polymer layers obtained by drying a coating film by repetition of the coating step and the drying step at least once while changing at least one of a type and addition amount of a component contained in the polymerizable liquid crystal composition, on a polymer layer obtained by drying the coated film.

14. The method of producing a film according to claim 1, wherein the polymerizable liquid crystal compound is a cholesteric liquid crystal compound, the method comprising an alignment step of aligning the polymerizable cholesteric liquid crystal compound by applying heat after the coating step to thereby form a state of a cholesteric liquid crystal phase, and an irradiation step of irradiating the polymerizable liquid crystal composition with actinic radiation to thereby fix the cholesteric liquid crystal phase.

15. The method of producing a film according to claim 1, wherein a chiral agent is added to the polymerizable liquid crystal composition.

16. The method of producing a film according to claim 1, wherein the polymer layer obtained by drying the coating film is an infrared light reflection layer that reflects infrared light having a wavelength of 800 nm or more.

17. The method of producing a film according to claim 1, comprising at least one step of drying a coated film to thereby form a layer that reflects light of right circularly polarized light, and at least one step of drying a coated film to thereby form a layer that reflects light of left circularly polarized light.

18. The method of producing a film according to claim 1, which is a method of producing a film for a window material for automobiles or a window material for buildings.

19. A film produced by the method of producing a film according to claim 1, comprising a compound represented by general formula (1).

20. A film produced by the method of producing a film according to claim 7, comprising a compound represented by general formula (1).

* * * * *